(12) United States Patent
Nagami et al.

(10) Patent No.: US 6,490,622 B1
(45) Date of Patent: *Dec. 3, 2002

(54) NODE DEVICE AND SCHEME FOR SHARING COMMON VIRTUAL CONNECTION INDENTIFIER BETWEEN END-NODES

(75) Inventors: Kenichi Nagami; Yasuhiro Katsube; Shigeo Matsuzawa, all of Tokyo (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/038,159

(22) Filed: Mar. 11, 1998

(30) Foreign Application Priority Data

Mar. 11, 1997 (JP) ................................. 9-055762
Mar. 14, 1997 (JP) ................................. 9-061393

(51) Int. Cl.[7] ........................... G06F 15/16; G06F 15/76
(52) U.S. Cl. ...................... 709/225; 709/238; 370/399; 370/409
(58) Field of Search .............................. 709/225, 238; 370/397, 399, 409

(56) References Cited

U.S. PATENT DOCUMENTS

| | | | | |
|---|---|---|---|---|
| 4,884,263 A | * | 11/1989 | Suzuki | 370/16 |
| 5,119,369 A | * | 6/1992 | Tanabe et al. | 370/60 |
| 5,163,045 A | * | 11/1992 | Caram et al. | 370/60.1 |
| 5,197,064 A | * | 3/1993 | Chao | 370/60 |

(List continued on next page.)

OTHER PUBLICATIONS

K. J. Nagami, Flow Attribute Notification Protocol (FNP) Specification.
Saito et al.; "LIS (Logical IP Subnet) Over ATM"; Institute of Electrical & Electronics Engineers; vol. 1; Jun. 23, 1996; pp. 398–404.
Saha et al.; "A Design for Implementation of the Internet Protocol in a Local ATM Network"; Institute of Electrical & Electronics Engineers; vol. 3; May 1, 1994; pp. 1326–1330.
Edwards et al.; "User–Space Protocols Deliver High Performance To Applications on a Low–Cost GB/S LAN"; Computer Communications Review; vol. 24, No. 4; Oct. 1, 1994; pp. 14–23.
Esaki et al.; "High Speed Datagram Delivery Over Internet Using ATM Technology"; IEICE Transactions on Communications; vol. E78–8, No. 8; Aug. 1, 1995; pp. 1208–1217.
Schill et al.; "Internetworking Over ATM: Experiences with IP/IPnG And RSVP"; Computer Networks and ISND Systems; vol. 28, No. 14; Nov. 1996; pp. 1915–1927.

*Primary Examiner*—Robert B. Harrell
*Assistant Examiner*—Steve Willett
(74) *Attorney, Agent, or Firm*—Foley & Lardner (57) ABSTRACT

A scheme for sharing a common virtual connection identifier between end-nodes, which enable sharing of a common identifier of a sufficient information length at both end-nodes of a virtual connection. In this scheme, the first message containing a first identifier for provisionally identifying a virtual connection commonly between neighboring nodes is exchanged between neighboring nodes, at a time of setting up the virtual connection. Then, the second message containing a second identifier having a larger information size than the first identifier for formally identifying the virtual connection commonly between neighboring nodes, in a form that enables establishing of a correspondence between the first identifier and the second identifier, is exchanged between neighboring nodes through another virtual connection different from the virtual connection to be set up. The correspondence between the first identifier and the second identifier is managed at each node according to the first message and the second message so as to share the second identifier between neighboring nodes.

28 Claims, 9 Drawing Sheets

U.S. PATENT DOCUMENTS

| | | | | |
|---|---|---|---|---|
| 5,271,010 | A | * 12/1993 | Miyake et al. | 370/94.1 |
| 5,309,437 | A | * 5/1994 | Perlman et al. | 370/85.13 |
| 5,347,633 | A | * 9/1994 | Ashfield et al. | 395/200 |
| 5,390,170 | A | * 2/1995 | Sawant et al. | |
| 5,392,402 | A | * 2/1995 | Robrock, II | 395/200 |
| 5,400,325 | A | * 3/1995 | Chatwani et al. | |
| 5,491,694 | A | * 2/1996 | Oliver et al. | 370/85.4 |
| 5,506,847 | A | * 4/1996 | Shobatake | 370/94.3 |
| 5,511,076 | A | * 4/1996 | Ramakrishnan et al. | 370/94.2 |
| 5,517,617 | A | * 5/1996 | Sathaye et al. | |
| 5,526,349 | A | * 6/1996 | Diaz et al. | 370/58.1 |
| 5,572,678 | A | * 11/1996 | Homma et al. | 395/200.12 |
| 5,579,480 | A | * 11/1996 | Cidon et al. | 395/200.1 |
| 5,583,863 | A | * 12/1996 | Darr, Jr. et al. | 370/397 |
| 5,684,961 | A | * 11/1997 | Cidon et al. | 395/200.15 |
| 5,699,347 | A | * 12/1997 | Callon | |
| 5,734,659 | A | * 3/1998 | Mann et al. | |
| 5,748,626 | A | * 5/1998 | Esaki et al. | 370/355 |
| 5,787,077 | A | * 7/1998 | Kuehnel | |
| 5,835,710 | A | * 11/1998 | Nagami et al. | 395/200.8 |
| 5,912,892 | A | * 6/1999 | Barnhart et al. | 370/397 |
| 5,917,819 | A | * 6/1999 | Yan et al. | |
| 5,920,560 | A | * 7/1999 | Takahashi et al. | 370/395 |
| 5,991,297 | A | * 11/1999 | Palnati et al. | |
| 6,069,889 | A | * 5/2000 | Feldman et al. | |

* cited by examiner

NODE DEVICE AND SCHEME FOR SHARING COMMON VIRTUAL CONNECTION INDENTIFIER BETWEEN END-NODES

BACKGROUND OF THE INVENTION

1. Field of the Invention

The present invention relates to a node device having interface for virtual connection-oriented network, and a scheme for sharing a common virtual connection identifier between end-nodes in forms of such node devices.

2. Description of the Background Art

Currently, a CSR (Cell Switch Router) has been proposed as a high speed router for connecting ATM (Asynchronous Transfer Mode) networks. This CSR has a built-in ATM switch for realizing a function of transfer in cell units in addition to a usual function of transfer in IP (Internet Protocol) packet units.

By utilizing this cell transfer function, it is possible to realize high throughput and low delay communications by taking full advantages of ATM according to the need, even in a case of passing through a router at an IP subnet boundary. Namely, in the ATM Internet formed by using CSRs, a packet assembling and a hop by hop IP transfer processing based on destination IP address are carried out similarly as in a conventional case for some communication at each CSR to be passed through, while a cell based transfer processing by only referring to VPI/VCI of a received cell is carried out for some other communication at each CSR to be passed through so as to omit IP transfer processing for each packet as much as possible. In the following, a VC (Virtual Connection) for realizing a hop by hop packet transfer will be referred to as a default VC, and a VC for realizing a cell based transfer will be referred to as a dedicated VC.

In the cell based transfer, it is not allowed to refer to a content of a packet so that a packet transfer without referring to a content of a packet is realized by using different dedicated VCs for different packet flows.

Also, in the cell based transfer, it is not allowed to refer to a content of a packet so that there is a need to exchange a message indicating that a packet with which destination is to be transferred through which dedicated VC, between neighboring nodes in advance. An identifier for identifying each dedicated VC which is necessary in this message will be referred to as VCID. Note that it is necessary for VCID to be a common identifier for both end-nodes of the dedicated VC.

In general, in ATM, a virtual connection identifier value (VPI/VCI) described in a cell header is different at both ends of the virtual connection. For this reason, it is necessary to provide a new identifier called VCID which is different from VPI/VCI and a scheme for establishing correspondence between the virtual connection identifier and the common identifier.

As a scheme for sharing an identical identifier at both ends, there is a scheme for notifying an identical identifier by using an ATM signaling message. For example, by using BLLI (Broadband Low Layer Information) as a common identifier (VCID), it is possible to establish correspondence between the virtual connection identifier and the common identifier.

However, this scheme is associated with a problem that a region available for the common identifier becomes small when a region available in the ATM signaling is small (BLLI field only has a 7 bit region that can be used by a user, for example), so that a number of dedicated VCs that can be used simultaneously will be limited.

On the other hand, there is also a scheme for establishing correspondence between the virtual connection identifier and the common identifier by sending a message containing the common identifier (VCID) through a dedicated VC (in-bound), as disclosed in "Flow Attribute Notification Protocol (FANP) Specification", draft-rfced-info-nagami-00.txt, IETF Internet Draft (February 1997).

However, this scheme is associated with a problem that it is difficult for a node that carries out the cell based transfer such as CSR to transmit a message packet with respect to a VC which is already carrying out the cell based transfer. This is because of the following.

First, in a case of transmitting a packet to an ATM network, there is a need to disassemble a packet into ATM cells (48 bytes). There are several methods for disassembling a packet into ATM cells, but a method called AAL5 is customarily used in general. This method divides a packet into segments in ATM cell (48 bytes) sizes, and attaches an "end of packet" marking only to the last ATM cell of this message. When ATM cells obtained by this method are received consecutively, a receiving node can recognize the last ATM cell of the packet and assemble the packet from received ATM cells. However, when another ATM cell unrelated to the disassembled packet gets mixed in a middle, it is impossible to assemble the packet from ATM cells.

Now, inserting a packet in order to attach a VCID to a VC that is carrying out the cell based transfer at CSR is equivalent to mixing ATM cells of a packet for VCID exchange in a middle of ATM cells belonging to packets transferred by the cell based transfer. Consequently, simply sending a message packet into a VC that is carrying out the cell based transfer causes cell mixing and thereby makes it impossible to assemble packets at a receiving node.

A need for sending a VCID exchange packet into a VC that is already carrying out the cell based transfer also arises at a time of set up of a virtual connection for multicast, for example. Namely, while the cell based transfer is carried out for participants of multicast by using an already set up virtual connection for multicast, if a new leaf for a new participant (node) is to be added to this virtual connection, a message packet to this new node would have to be sent through that VC which is already carrying out the cell based transfer according to the conventional scheme for sending a message in-bound.

SUMMARY OF THE INVENTION

It is therefore an object of the present invention to provide a node device and a scheme for sharing a common virtual connection identifier between end-nodes, which enable sharing of a common identifier at both end-nodes of a virtual connection for which a common identifier is required, without sending a message in-bound through that virtual connection, while attaching a sufficiently large common identifier to that virtual connection.

According to one aspect of the present invention there is provided a node device, comprising: an interface for a virtual connection-oriented network; a first message exchange unit for exchanging a first message which contains a first identifier for provisionally identifying a virtual connection commonly between said node device and a neighboring node device, at a time of setting up the virtual connection through the interface; a management unit for managing a correspondence between the first identifier and a second identifier having a larger information size than the first identifier for formally identifying the virtual connection commonly between said node device and the neighboring node device; and a second message exchange unit for transmitting or receiving a second message which contains the second identifier in a form that enables establishing of a correspondence between the first identifier and the second identifier, through another virtual connection different from the virtual connection to be set up.

According to another aspect of the present invention there is provided a method for sharing a common virtual connection identifier between neighboring nodes, comprising the steps of: exchanging a first message between the neighboring nodes, the first message containing a first identifier for provisionally identifying a virtual connection commonly between the neighboring nodes, at a time of setting up the virtual connection; exchanging a second message between the neighboring nodes, the second message containing a second identifier having a larger information size than the first identifier for formally identifying the virtual connection commonly between the neighboring nodes, in a form that enables establishing of a correspondence between the first identifier and the second identifier, through another virtual connection different from the virtual connection to be set up; and managing a correspondence between the first identifier and the second identifier at each of the neighboring nodes according to the first message and the second message so as to share the second identifier between the neighboring nodes.

According to another aspect of the present invention there is provided an article of manufacture, comprising: a computer usable medium having computer readable program code means embodied therein for causing a computer at a node device to function as a system that enable sharing of a common virtual connection identifier between neighboring nodes, the computer readable program code means includes: first computer readable program code means for causing said computer to exchange a first message which contains a first identifier for provisionally identifying a virtual connection commonly between said node device and a neighboring node device, at a time of setting up the virtual connection; second computer readable program code means for causing said computer to manage a correspondence between the first identifier and a second identifier having a larger information size than the first identifier for formally identifying the virtual connection commonly between said node device and the neighboring node device; and third computer readable program code means for causing said computer to transmit or receive a second message which contains the second identifier in a form that enables establishing of a correspondence between the first identifier and the second identifier, through another virtual connection different from the virtual connection to be set up.

Other features and advantages of the present invention will become apparent from the following description taken in conjunction with the accompanying drawings.

DETAILED DESCRIPTION OF THE PREFERRED EMBODIMENTS

In the following description, an exemplary case of a node connected to an ATM network will be descried. However, the present invention is not limited to this particular case of a node connected to an ATM network, and indeed is equally applicable to any case of using a virtual connection-oriented network in which a virtual connection identifier (VPI/VCI of ATM) is different at both ends of a virtual connection (denoted hereafter as VC).

Referring now to FIG. 1 to FIG. 6, the first embodiment of a node device and a scheme for sharing a common virtual connection identifier between end-nodes according to the present invention will be described in detail.

First, the outline of the present invention is briefly summarized. In the ATM network, a virtual connection identifier (VPI/VCI) is different at both ends of VC in general. The present invention provides a procedure for sharing the same common identifier (denoted hereafter as VCID) at both ends of this VC which will now be described with reference to FIG. 1.

Figure 1:
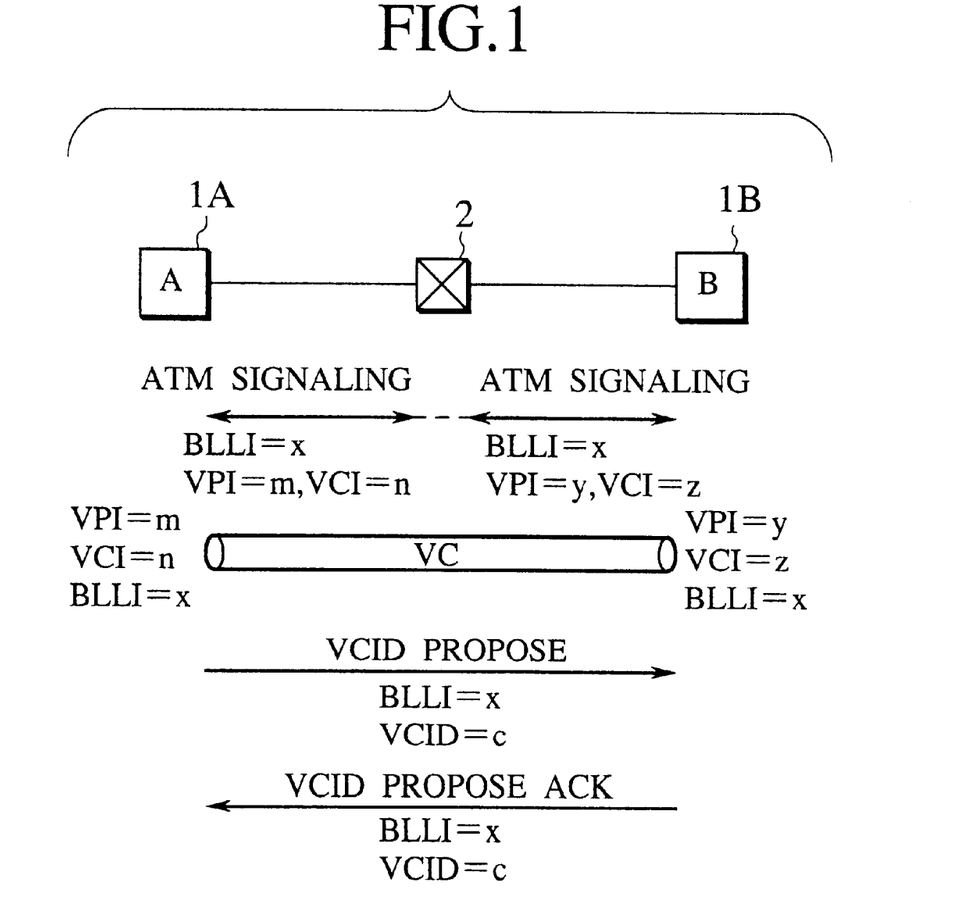
FIG. 1 is a diagram for explaining a scheme for sharing a common virtual connection identifier between end-nodes according to the first embodiment of the present invention.

FIG. 1 shows a state in which a node A (1A) and a node B (1B) are connected through an ATM switch (2). In this state, a procedure for setting up a VC from the node A to the node B, and sharing the same VCID at both ends of this VC is carried out as follows.

(I) A provisional common identifier is notified from the node A to the node B by using an information element (such as BLLI) in a set up message of the ATM signaling (datalink layer signaling for ATM). By means of this, a correspondence between a provisional common identifier (BLLI=x) and an actual identifier (VPI/VCI) of VC to be given to a cell header can be established. More specifically, a correspondence between BLLI=x and VPI=m, VCI=n is established at the node A, while a correspondence between BLLI=x and VPI=y, VCI=z is established at the node B. Here, the reason for not using an identifier given by BLLI as a formal identifier is that this information element (BLLI) has only a 7 bit space (128 values). For this reason, if this is assigned as a formal identifier it would be possible to recognize only 128 VCs. Consequently, BLLI is used as a provisional identifier, and a formal identifier (VCID) is assigned by the subsequent process.

(II) The provisional common identifier (BLLI) exchanged in (I) and the common identifier (VCID) to be used formally at both ends are entered into a newly defined message (VCID PROPOSE), and this message is exchanged between the nodes A and B through a default VC (a VC other than that shown in FIG. 1 for which the identifier is to be assigned), so as to establish a correspondence between BLLI and VCID. Then, using this correspondence and the correspondence established in (I), it is possible to establish a correspondence between the identifier (VPI/VCI) of VC to be given to a cell header and the common identifier (VCID) to be used formally at both ends. This VCID PROPOSE message can be processed at the IP (network layer) level (assuming that the nodes 1 are hosts or routers having a network layer processing function).

In this manner, VCID can be shared without exchanging VCID by sending a message in-bound through a newly set up VC, so that it is possible to eliminate the conventionally encountered problem that there arises a need to send a message through the same VC while carrying out the cell based transfer.

Now, more concrete processing procedure and node configuration according to the first embodiment will be described in detail.

Figure 2:
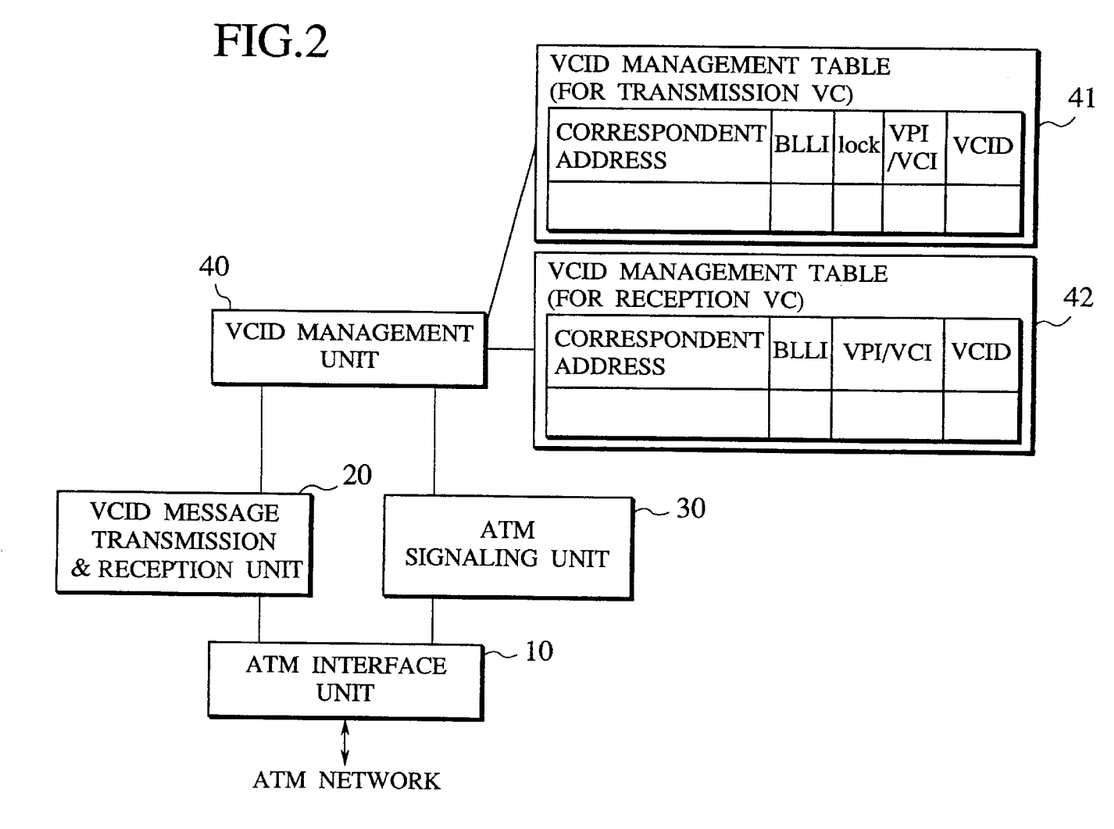
FIG. 2 is a block diagram of a node device according to the first embodiment of the present invention.

First, FIG. 2 shows a node configuration according to the first embodiment, in which an ATM interface unit 10 transmits message from a VCID message transmission and reception unit 20 and an ATM signaling unit 30 as well as other data packets to the ATM network (not shown). At this point, a processing for disassembling messages or packets into ATM cells is to be carried out. Also, at this ATM interface unit 10, messages or data packets are assembled from ATM cells received through the ATM network and messages are given to the VCID message transmission and reception unit 20 or the ATM signaling unit 30, while the other data packets are given to an IP processing unit (not shown). This message/packet assembling/disassembling processing can be realized by AAL processing, SSCOP processing for signaling, or IP processing, for example.

Note here that, in a case where the node has the cell based transfer function which does not use any packet assembling, not all the data packets are going to be assembled and given to the IP processing unit, and ATM cells corresponding to those packets which belong to specific flows are to be transmitted to the ATM network again, in forms of ATM cells.

The VCID message transmission and reception unit 20 carries out transmission and reception of VCID PROPOSE message and VCID PROPOSE ACK message for the purpose of establishing a correspondence between the provisional common identifier (BLLI) and the formal common identifier (VCID) according to a command from a VCID management unit 40. More specifically, VCID PROPOSE message or VCID PROPOSE ACK message is transmitted to the ATM interface unit 10, and VCID PROPOSE ACK message or VCID PROPOSE message is received from the ATM interface unit 10.

The ATM signaling unit 30 transmits an ATM signaling message to the ATM interface unit 10 when a set up/release of an ATM connection is commanded from the VCID management unit 40, or receives an ATM signaling message from the ATM interface unit 10. By means of this ATM signaling message exchange, it is possible to set up/release a VC of ATM.

The VCID management unit 40 establishes a correspondence between the VC identifier (VPI/VCI) and the common identifier VCID, commands the ATM signaling unit 30 to set up a VC of ATM, and commands the VCID message transmission and reception unit 20 to carry out exchange of VCID, while registering results of these operations in VCID management tables 41 and 42.

Figure 3:
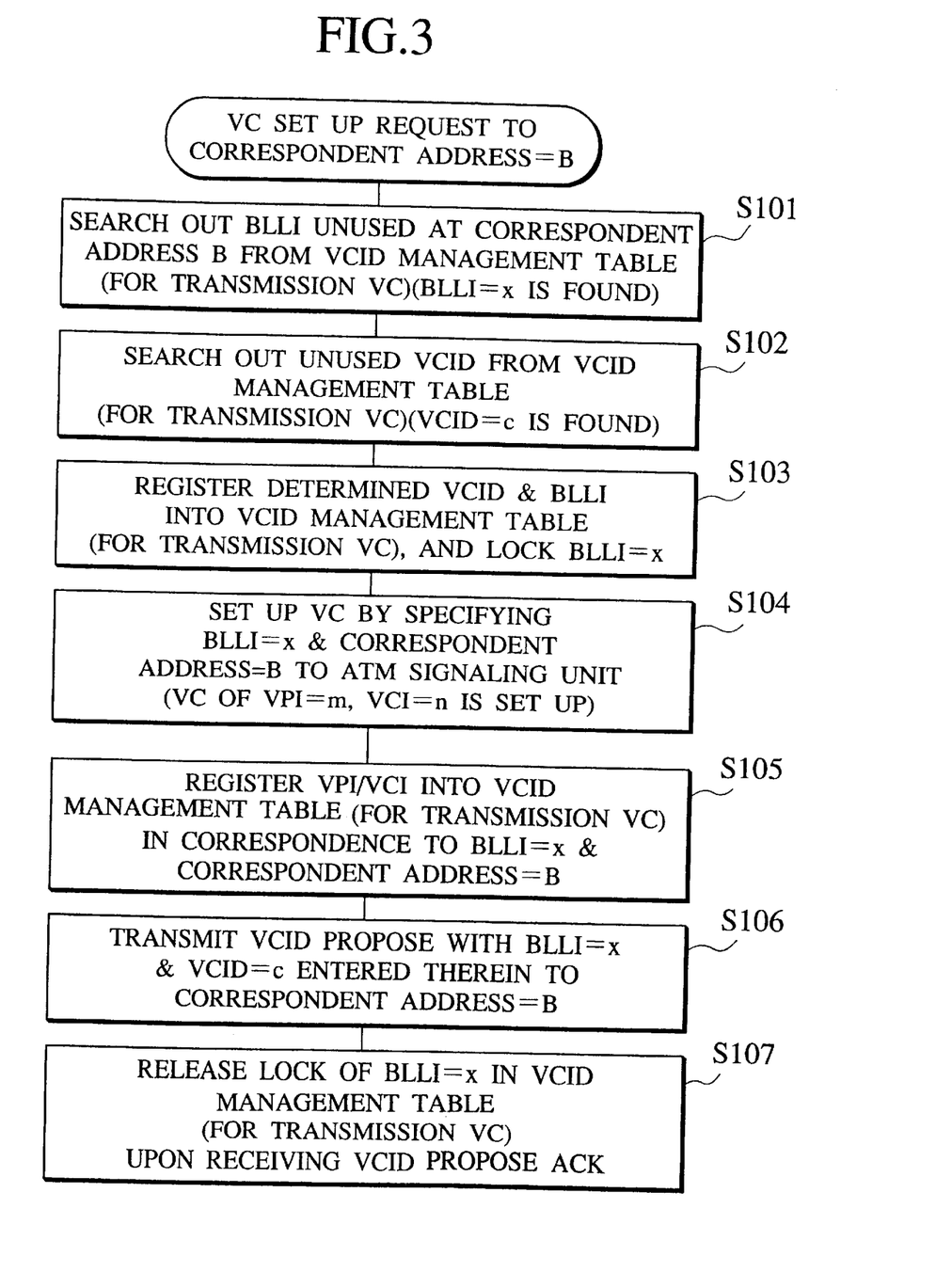
FIG. 3 is a flow chart of the operation of a VCID management unit in a transmitting node according to the first embodiment of the present invention.
Figure 4A:
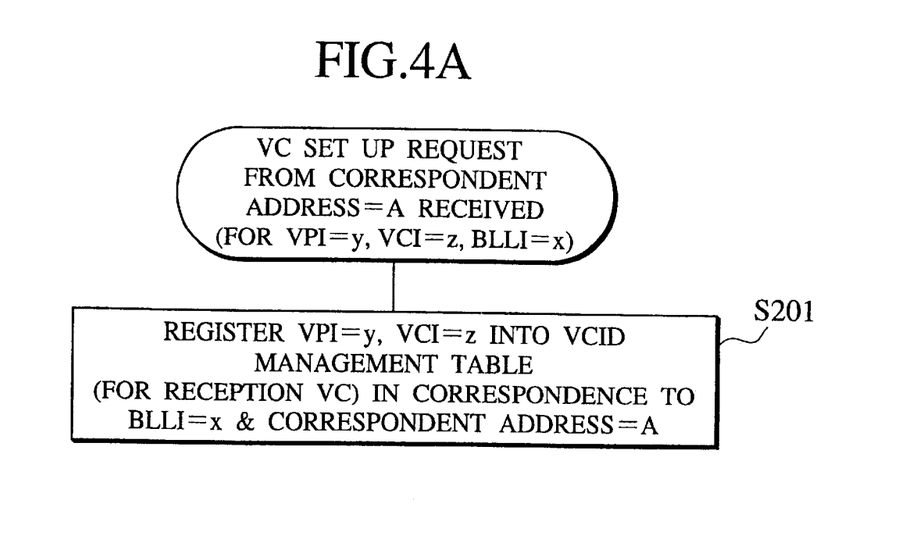
FIGS. 4A and 4B are flow charts of the operation of a VCID management unit in a receiving node according to the first embodiment of the present invention.
Figure 4B:
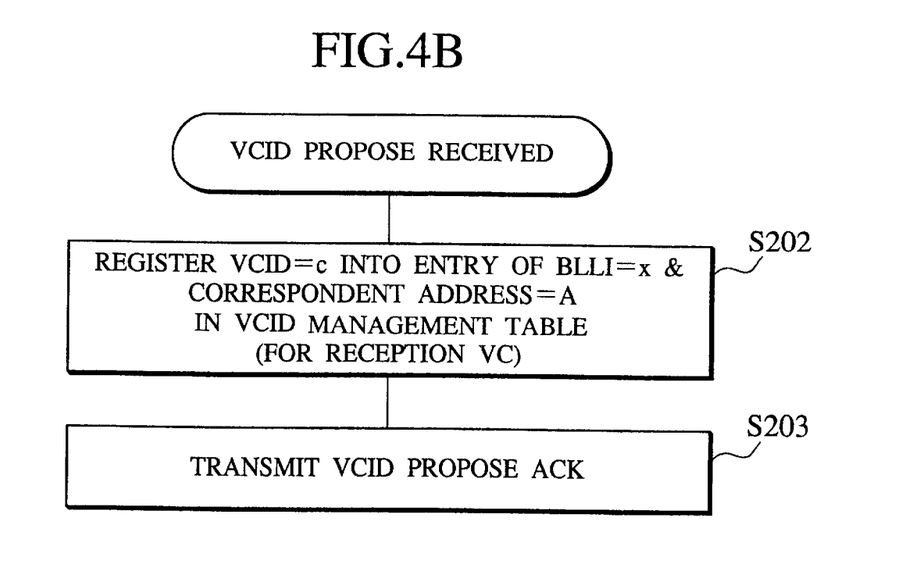

Next, with reference to FIG. 3 and FIGS. 4A and 4B, the operation of the VCID management unit 40 will be described. FIG. 3 shows a flow chart of the operation of the VCID management unit 40 in a node (referred to as a transmitting node) that sets up a VC, and FIGS. 4A and 4B show flow charts of the operation of the VCID management unit 40 in a node (referred to as a receiving node) to which a VC is set up. The message exchanges involved here are the same as those shown in FIG. 1. It is assumed here that the node A is the transmitting node and the node B is the receiving node in FIG. 1.

When the transmitting node sets up a VC, the processing according to the flow chart of FIG. 3 is carried out as follows.

First, a BLLI value that is currently not used at the correspondent address B is searched out from the VCID management table (for transmission VC) 41 (step S101). Here, it is assumed that BLLI=x is the searched out unused BLLI value. Note that the BLLI value is to be used only between neighboring nodes so that it suffices for this BLLI value to be unique between the node A and the node B. Also, when this BLLI value is a 7 bit value, it is possible to distinguish 128 VCs simultaneously.

Next, an unused VCID is searched out from the VCID management table (for transmission VC) 41 (step S102). Here, it is assumed that VCID=c is the searched out unused VCID. Here, a number of bits for VCID is optional (but should be greater than a number of bits for BLLI). For this reason, it is sufficient to determine a number of bits for VCID by accounting for a number of VCs that could be required simultaneously.

Next, VCID=c and BLLI=x as determined above are registered into the VCID management table (for transmission VC) 41, while BLLI is locked so that BLLI=x will not be used until a VCID PROPOSE ACK message is returned as described below (step S103). Also, VCID=c is prevented from being used for the other VC until the VC release as described below.

Next, the ATM signaling unit 30 is commanded to set up a VC by specifying BLLI=x and the correspondent address B (step S104). When the VC is set up as the ATM signaling is successful, VPI/VCI of that VC as notified from the ATM network are registered into the VCID management table (for transmission VC) 41 in correspondence to BLLI=x and the correspondent address=B (step S105). Here, it is assumed that the VC of VPI=m, VCI=n is set up.

Next, a VCID PROPOSE message with BLLI=x and VCID=c described therein is transmitted to a node (node B) of the correspondent address through a default VC (not shown) (step S106). Then, when a response to this message in a form of a VCID PROPOSE ACK message is received, the lock in the VCID management table (for transmission VC) is released (step S107). By releasing the lock, the provisional common identifier is released so that it becomes possible to use BLLI=x again.

Note that VCID set up here is to be continually used as the common identifier of the VC as long as that VC remains set up, and this VCID is to be released when that VC is released.

On the other hand, at the receiving node, when a VC set up request is received from the transmitting node by using the ATM signaling, VPI/VCI contained in that message are registered into the VCID management table (for reception VC) 42 in correspondence to BLLI=x and the correspondent address=A contained in that message (step S201 of FIG. 4A).

Also, when the VCID PROPOSE message is received, the VCID management table (for reception VC) 42 is searched through by using BLLI=x described in that VCID PROPOSE message and the transmitting node A of that VCID PROPOSE message as search key, and VCID=c described in that VCID PROPOSE message is registered into the searched out entry of the VCID management table (for reception VC) 42 corresponding to BLLI=x and the correspondent address A (step S202 of FIG. 4B). Then, a VCID PROPOSE ACK message is returned to the transmitting node A (step S203 of FIG. 4B).

By means of the above described operation, the transmitting node establishes a correspondence between VPI=m, VCI=n and VCID=c, while the receiving node establishes a correspondence between VPI=y, VCI=z and VCID=c, so that it is possible to assign the common identifier VCID=c to the same VC at both ends.

Now, with reference to FIG. 5, a procedure for setting up a point-to-multipoint connection in which a node C (1C) is added as a leaf to a connection already set up between a node A (1A) and a node B (1B), and assigning VCID (sharing VCID between the node A and the node C) to this point-to-multipoint connection while the node A (1A) and the node B (1B) already shares the common VCID will be described.

In this case, at a time of setting up the point-to-multipoint VC having the node C as a leaf, the node A carries out the operation according to the flow chart of FIG. 6 as follows.

First, upon receiving a request for adding leaf to the node C to the already set up VC, an entry corresponding to VPI=m, VCI=n to which a leaf is to be added is searched out from the VCID management table (for transmission VC) 41, and BLLI=x and VCID=c are taken out from the searched out entry, while BLLI=x is locked and the correspondent address C is registered (step S301).

Here, there is a possibility that BLLI=x of the VC, to which a leaf is to be added, as registered in the VCID management table (for transmission VC) 41 is currently locked as it is utilized in the VCID assignment procedure for another VC between the node A and the node C. In such a case, it is necessary for the VCID assignment processing for the VC to which a leaf is to be added to wait until the lock due to that another VC is released.

In order to avoid such a collision in the BLLI utilization, it is also possible to adopt a scheme in which the lock of BLLI is not to be released (or BLLI is continually used as VCID directly) even after VCID is assigned, as far as a point-to-multipoint VC (a VC for which there is a possibility for adding or deleting leaves later on) is concerned.

It is also possible to adopt a scheme in which a value of BLLI to be used at a time of adding a new leaf node C is determined independently from a value originally used when VCID was assigned between the nodes A and B. In such a case, the original BLLI value used in assigning VCID between the nodes A and B is to be deleted from the VCID management table at the same time as the lock of BLLI is released when the VCID assignment is completed.

In a case of deleting BLLI value from the VCID management table while releasing the lock of BLLI=x as the VCID sharing between the nodes A and B is completed, the searched out entry at the step S301 has a BLLI field empty, so that a BLLI value which is currently not used at the correspondent address C is newly searched out at a time of the VCID message exchange between the nodes A and C, and registered along the correspondent address C in the entry of VPI=m, VCI=n, such that the following steps are carried out by using this new BLLI value. Also, even in a case where BLLI=x is remaining in the VCID management table, whether this BLLI value is currently not used at the correspondent address C or not should be checked before using it, and if it is currently used another BLLI value should be searched out and registered.

Also, VCID to be used here may not necessarily be the same value as that used in the VCID message exchange between the nodes A and B. Namely, it is possible to use VCID which is different from that used between the nodes A and B by searching out VCID that is currently not used similarly as in the step S102 of FIG. 3, instead of taking out VCID=c at the step S301. In this case, it is necessary to register the new VCID into the VCID management table at the step S301.

Next, the ATM signaling unit 30 is commanded to add a leaf by specifying BLLI=x and the correspondent address C (step S302). Then, when it is recognized that a leaf has been set up, a VCID PROPOSE message with BLLI=x and VCID=c described therein is transmitted to a node (node C) of the correspondent address through a default VC (not shown) between the nodes A and C (step S303).

Then, when a VCID PROPOSE ACK message is received, the lock of BLLI=x in the VCID management table (for transmission VC) 41 is released so as to make BLLI=x available for the other virtual connection (step S304).

In this case, the node C operates similarly as the node B according to the flow charts of FIGS. 4A and 4B as described above.

Note that messages described in this concrete example are to be transmitted through the default VC rather than a newly set up VC. By means of this provision, it becomes possible to realize the VCID exchange with a new node without sending messages through a newly set up VC (a point-to-multipoint connection to which a leaf is added), in a case where the node A in FIG. 5 has the cell based transfer function just like CSR and a VC to be set up here is a VC for carrying out the cell based transfer.

Figure 5:
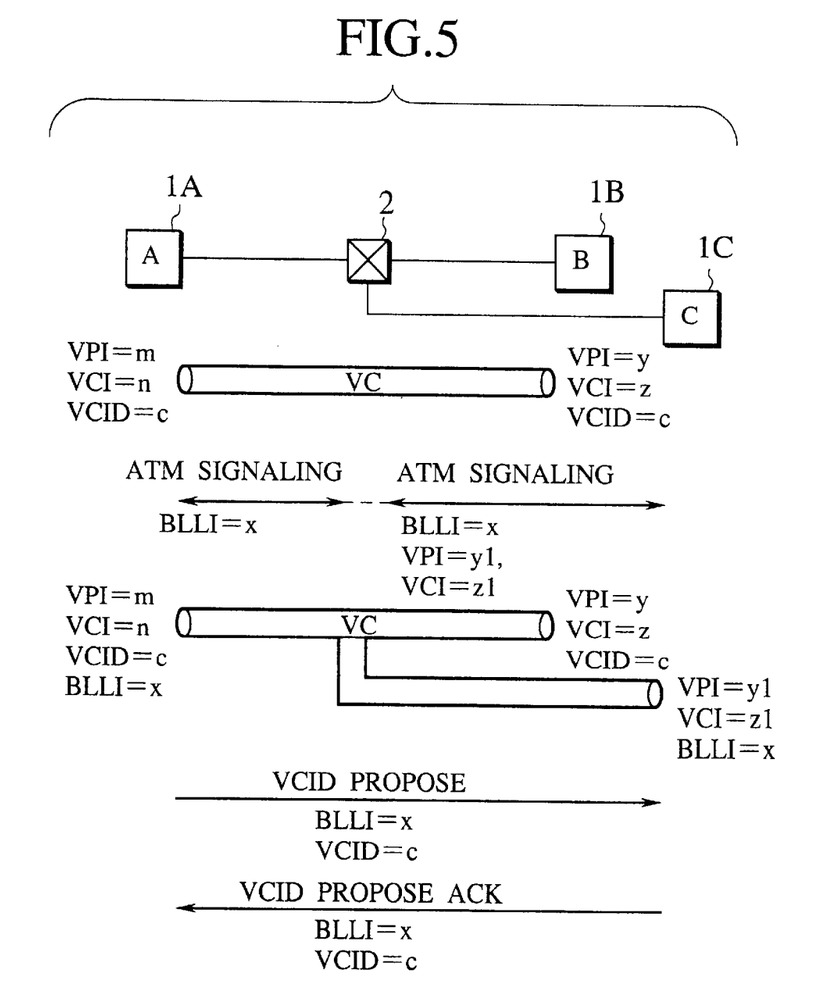
FIG. 5 is a diagram for explaining a scheme for sharing a common virtual connection identifier between end-nodes in a case of point-to-multipoint connection according to the first embodiment of the present invention.
Figure 6:
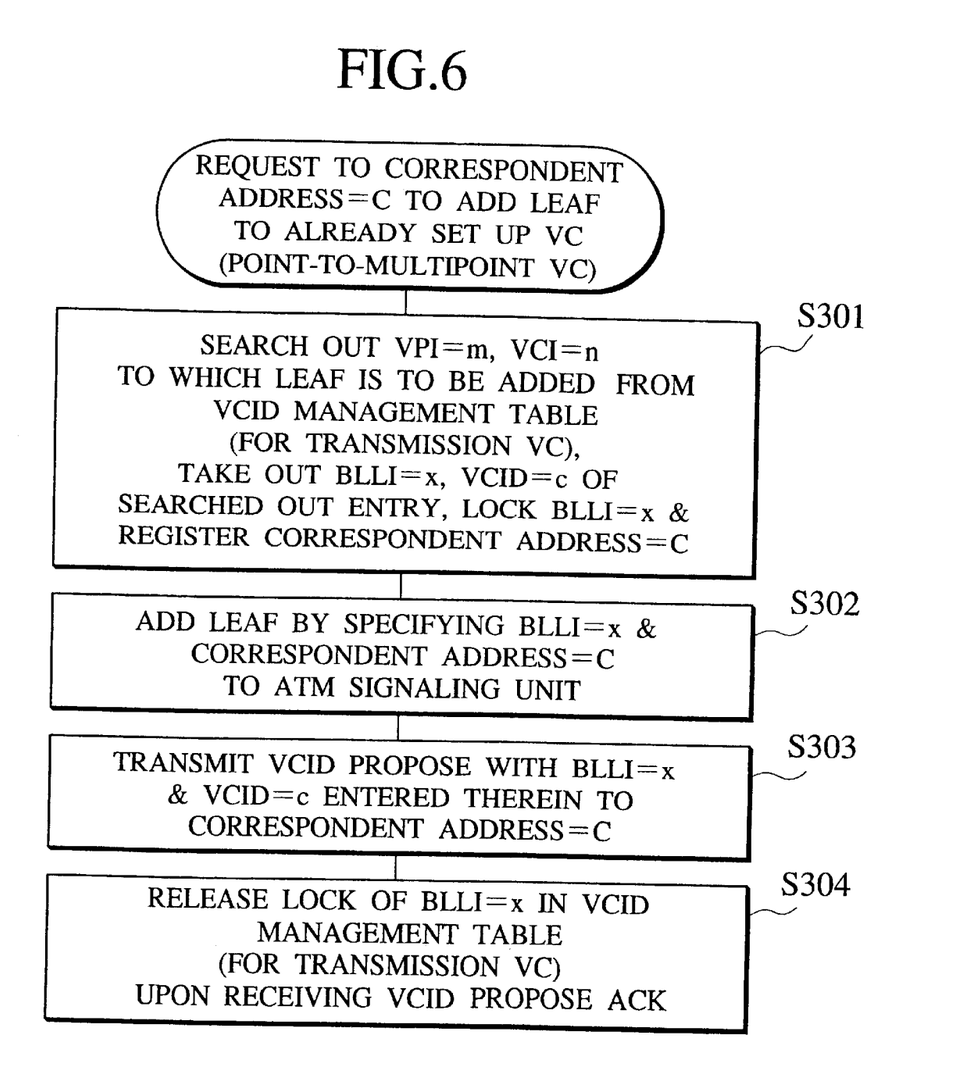
FIG. 6 is a flow chart of the operation of a transmitting node in the case shown in FIG. 5.

Note that FIG. 5 shows an exemplary case where an upstream node A determines and notifies values of BLLI=x and VCID=c, but it is also possible to realize a case where a downstream node C determines both of these values and notifies them to the upstream node A, a case where the upstream node A determines BLLI=x and notifies it to the downstream node C while the downstream node C determines VCID=c and notifies it to the upstream node A, or a case where the downstream node C determines BLLI=x and notifies it to the upstream node A while the upstream node A determines VCID=c and notifies it to the downstream node C.

Figure 7:
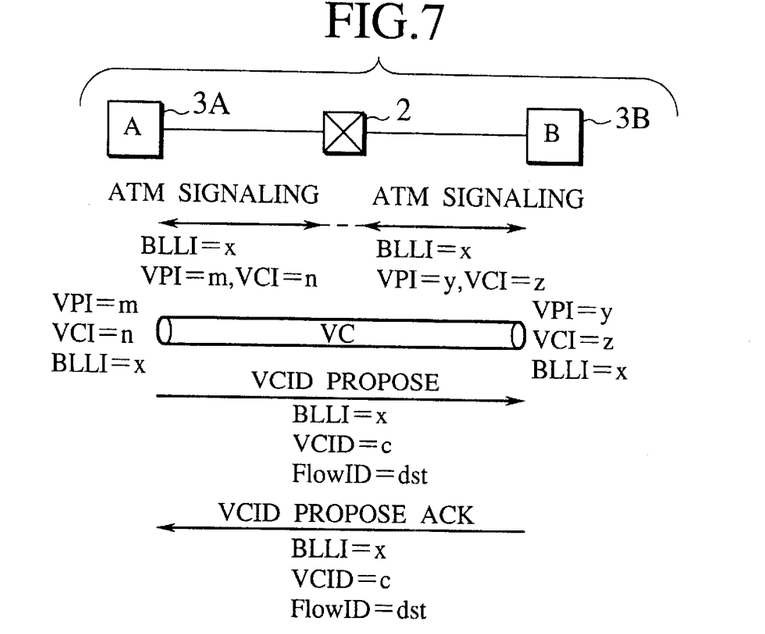
FIG. 7 is a diagram for explaining a scheme for sharing a common virtual connection identifier between end-nodes according to the second embodiment of the present invention.

Referring now to FIG. 7, the second embodiment of a node device and a scheme for sharing a common virtual connection identifier between end-nodes according to the present invention will be described in detail.

In this embodiment, a case of applying the scheme of the first embodiment to CSR will be described. In particular, this embodiment realizes the reduction of a number of messages to be exchanged between CSRs by entering information on Flow ID to be exchanged between CSRs into the VCID PROPOSE message used in the first embodiment.

Namely, in the case of CSR, there is a need to exchange information indicating a flow of that VC (dedicated VC) to which packets are to be transmitted, between neighboring nodes. This can be realized by transmitting another message containing VCID and Flow ID through the default VC, after VCID is shared between neighboring nodes as in the first embodiment. Alternatively, this cal also be realized by including Flow ID in the VCID PROPOSE message used in the first embodiment.

First, the outline of this second embodiment will be summarized. Consider a case shown in FIG. 7 where a node A (3A) and a node B (3B) are CSRs. In the case of CSR, it is necessary for both ends of VC to exchange a correspondence between the common identifier (VCID) of that VC and an identifier of flow (Flow ID) of packets to be transmitted through that VC. In this embodiment, it is possible to realize both the VCID exchange and the Flow ID exchange using a single message, by entering Flow ID into a message for exchanging the common identifier between both ends of VC described above in the first embodiment.

When a correspondence between Flow ID and VCID is established between CSRs, the transmitting side transmits only packets specified by Flow ID through VC assigned with that VCID, so that the receiving side can recognize that packets transmitted from VC assigned with that VCID are packets specified by Flow ID. In other words, it is possible to recognize the flow information such as destination without looking into contents of packets. Consequently, it becomes possible to carry out the cell based transfer, for example.

In FIG. 7, the node A and the node B are connected through an ATM switch similarly as in FIG. 1 of the first embodiment. First, a VC is set up by entering BLLI=x in the ATM signaling message. Then, in addition to two pieces of information BLLI and VCID carried by the VCID PROPOSE message as in the first embodiment, the second embodiment also includes Flow ID in this VCID PROPOSE message so that the correspondence between VCID and Flow ID is established at the same time the correspondence between VCID and VPI/VCI is established. By including Flow ID in the newly defined VCID PROPOSE message, it is possible to reduce a number of messages to be exchanged.

The correspondence between VCID and Flow ID that is established by this message exchange will be released when a corresponding ATM connection is released. The release of an ATM connection may be carried out when it is judged that it is no longer necessary to maintain the dedicated VC for that flow, or when a number of unused dedicated VCs that remain set up between neighboring nodes exceeds a prescribed number. When an ATM connection is released VCID is also released so that the same procedure as described above is to be repeated again in a case of setting up an ATM connection next time.

Here, if it is desired to reduce a number of times for setting up ATM connection, the following scheme can be adopted. Namely, it is possible to adopt a provision that leaves the virtual connection and its VCID remaining (in unused state) without releasing them even when it becomes no longer necessary to transmit packets of a flow that are transmitted through that virtual connection up to that time. Then, only the correspondence between VCID of that virtual connection and Flow ID is removed by using a newly defined REMOVE message.

The REMOVE message has VCID to be released described therein. When this REMOVE message is received, the correspondence between VCID and Flow ID that has been stored according to the VCID PROPOSE message is removed, but the correspondence between VCID and ATM connection (VPI/VCI) is left in the VCID management table.

Then, when there arises a need to use a dedicated VC for a new flow, a VC is selected from unused VCs for which VCIDs are remaining in the VCID management table, and a message containing VCID of the selected VC and a new Flow ID is sent through the default VC. In this manner, it becomes possible to reuse ATM connection without requiring the VCID exchange procedure to be repeated.

Note that the releasing of ATM connection and the transmission of REMOVE message can be carried out by either the upstream node A or the downstream node B.

Referring now to FIG. 8 to FIG. 11, the third embodiment of a node device and a scheme for sharing a common virtual connection identifier between end-nodes according to the present invention will be described in detail.

The first and second embodiments described above are directed to a case where all the notifications of BLLI, VCID and Flow ID are to be initiated by the upstream side node (node A) which functions to transmit packet flow among the neighboring nodes A and B, but it is also possible for the downstream side node to initiate these notifications. In addition, it is also possible to interchange the order of the dedicated VC set up using the ATM signaling and the notification of Flow ID and the like. This third embodiment describes some exemplary cases for such alternative realization of the present invention.

Figure 8:
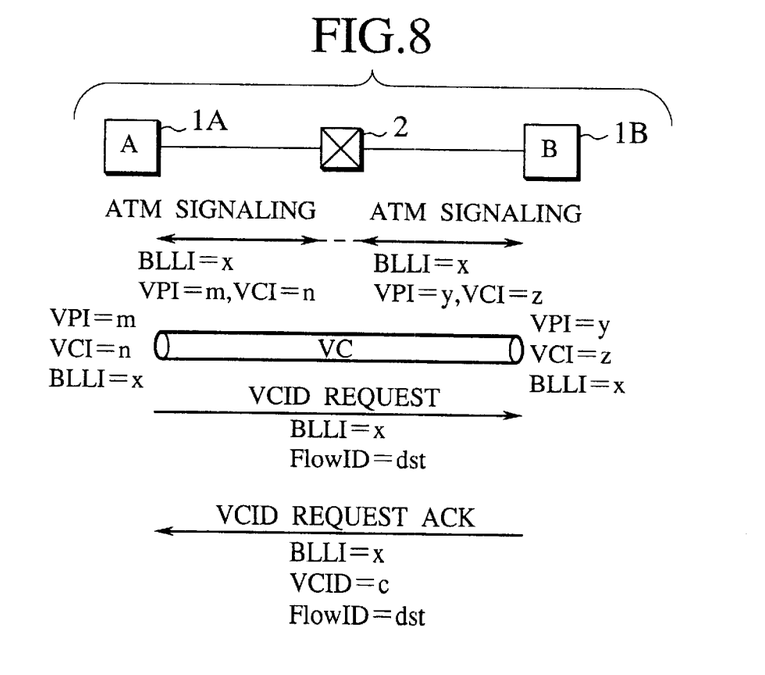
FIG. 8 is a diagram for explaining one exemplary case of a scheme for sharing a common virtual connection identifier between end-nodes according to the third embodiment of the present invention.

FIG. 8 shows one exemplary case according to the third embodiment. In this case of FIG. 8, a VC is set up by entering BLLI=x in the ATM signaling message first. This VC set up and BLLI specification may be carried out from the upstream side or the downstream side, but in a case of point-to-multipoint connection it is preferable for the upstream side to determine the BLLI value because it is preferable to use the same BLLI value for all leaf nodes of the point-to-multipoint connection. In any case, a value of BLLI=x in the VCID management table of each node with respect to the correspondent node is locked at this point so that it will not be utilized by the others.

Then, the upstream node A notifies the correspondence between VC (BLLI=x) that is set up and Flow ID toward the downstream node B, while transmitting a message for requesting assignment of VCID value to be used formally to the node B (VCID REQUEST). Then, the node B determines VCID value c to be assigned to this VC, and notifies this VCID value to the node A along with the notified Flow ID and BLLI value (VCID REQUEST ACK). The lock of BLLI=x is released at this point, and the VC is identified by VCID=c in the subsequent processing.

Figure 9:
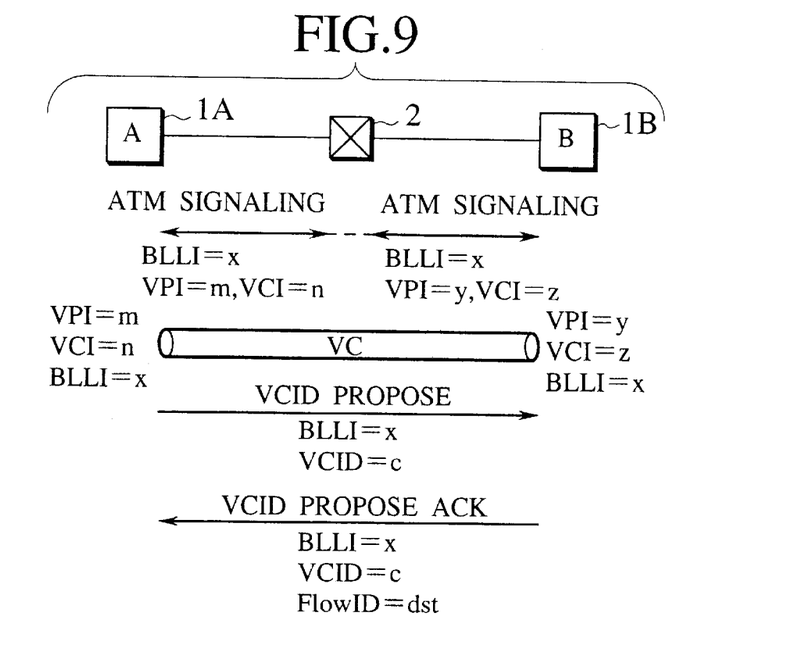
FIG. 9 is a diagram for explaining another exemplary case of a scheme for sharing a common virtual connection identifier between end-nodes according to the third embodiment of the present invention.

FIG. 9 shows another exemplary case according to the third embodiment. In this case of FIG. 9, a VC is set up by entering BLLI=x in the ATM signaling message, and BLLI=x of each node with respect to the correspondent node is locked at this point. Then, the downstream node B determines VCID value c and notifies this VCID value along with BLLI=x to the upstream node A (VCID PROPOSE). Upon receiving this message, the upstream node A notifies Flow ID indicating information regarding a flow to be transmitted through that VC to the node B along with BLLI=x and VCID=c (VCID PROPOSE ACK). The lock of BLLI=x is released at this point, and the VC is identified by VCID=c in the subsequent processing.

Figure 10:
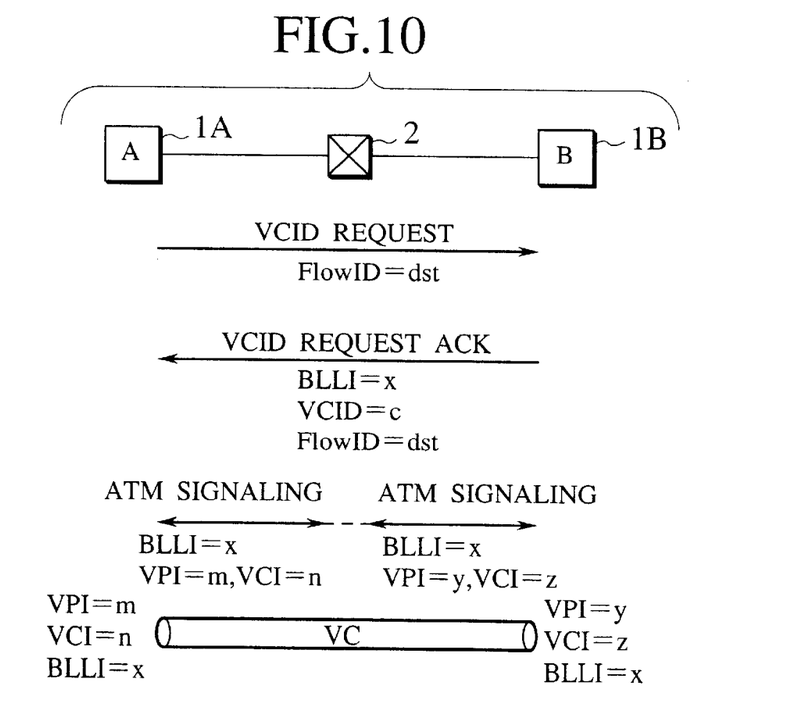
FIG. 10 is a diagram for explaining another exemplary case of a scheme for sharing a common virtual connection identifier between end-nodes according to the third embodiment of the present invention.

FIG. 10 shows another exemplary case according to the third embodiment. In this case of FIG. 10, the upstream node A transmits a message requesting set up of a dedicated VC for a certain flow to the downstream node B (VCID REQUEST) and the node B transmits a message indicating an acceptance of VCID REQUEST to the node A (VCID REQUEST ACK), and then a dedicated VC (BLLI=x) is set up by using the ATM signaling.

Note here that FIG. 10 shows a case where the downstream node B determines BLLI=x and VCID=c and notifies them to the upstream node A along with Flow ID, but it is also possible to consider a scheme where either one or both of them is to be determined by the upstream node A. In other words, the VC is set up by carrying out the ATM signaling using the determined BLLI value after: (1) the node A notifies Flow ID and the determined BLLI value to the node B (VCID REQUEST) and the node B notifies the VCID value determined in response to that to the node A along with Flow ID or BLLI (VCID REQUEST ACK); or (2) the node A notifies Flow ID and the determined VCID value to the node B (VCID PROPOSE) and the node B notifies the BLLI value determined in response to that to the node A along with Flow ID or VCID (VCID PROPOSE ACK); or else (3) the node A notifies Flow ID and the determined BLLI and VCID values to the node B (VCID PROPOSE). In any case, when BLLI=x and VCID=c are determined and notified to the correspondent node, this BLLI value is locked so that it will not be utilized by the other VC of this transmission and reception pair, and the lock is released when the VC set up by the ATM signaling is successfully completed.

Figure 11:
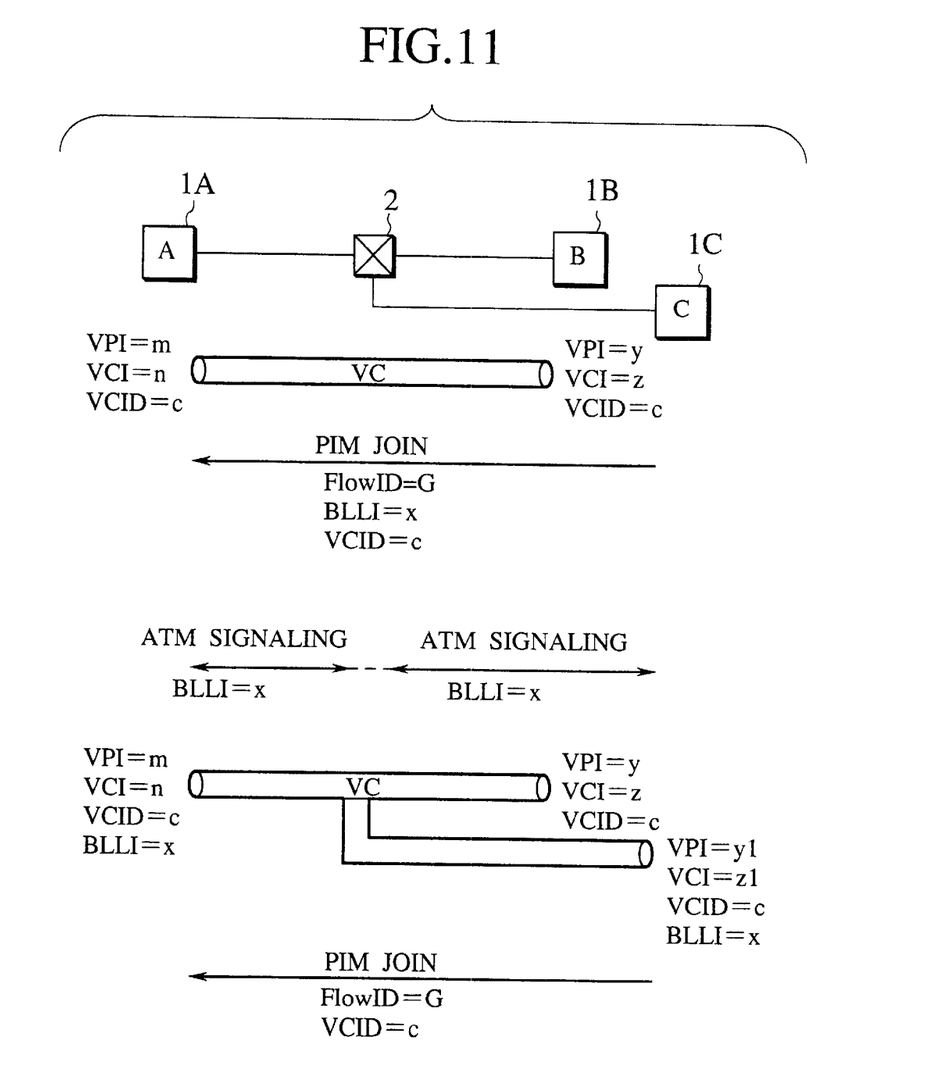
FIG. 11 is a diagram for explaining another exemplary case of a scheme for sharing a common virtual connection identifier between end-nodes according to the third embodiment of the present invention.

FIG. 11 shows another exemplary case of the third embodiment, which is directed to a case where a new leaf node C is to be added to a point-to-point VC set up between nodes A and B. In this case of FIG. 11, BLLI=x, VCID=c and Flow ID=group address are entered into a PIM JOIN message for indicating a participation to multicast, which is to be transmitted from the node C to the node A. At this point, BLLI=x is located at the VCID management units of the nodes A and C. Then, the node A carries out the addition of the leaf node C by using the ATM signaling (with BLLI=x), and the lock of BLLI=x is released when this addition is completed.

Note that the PIM JOIN message to be transmitted regularly from the downstream node C in order to maintain this added leaf contains at least Flow ID. As already described, it is also possible to consider a scheme where BLLI value is used directly as VCID without locking BLLI value in the case of multicast. It is also possible to consider a scheme in which only Flow ID is entered into the PIM JOIN message while BLLI=x is subsequently shared between the nodes A and C by using the ATM signaling, and then the correspondence among BLLI=x, VCID=c and Flow ID is notified between the nodes A and C. In this case, the processing procedure is equivalent to that shown in FIG. 5 described above.

As described, according to the present invention, it is possible to assign the common identifier of a sufficiently large information size to VC without transmitting a message through that VC to which the common identifier is to be assigned, so that it becomes possible to recognize a sufficiently large number of VCs simultaneously.

It is to be noted that the above described embodiments are described for an exemplary case of using ATM signaling message for the purpose of provisional common identifier exchange and message exchange through a default VC for the purpose of formal common identifier exchange, but the present invention is not limited to this particular case and it suffices for the present invention to use general signaling message (preferably datalink layer signaling message) for the purpose of provisional common identifier exchange and message exchange (preferably network layer message exchange) through a control VC different from the VC to which the common identifier is to be assigned for the purpose of formal common identifier exchange.

It is also to be noted that the above described embodiments according to the present invention may be conveniently implemented using conventional general purpose digital computers programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the VCID message transmission and reception unit 20, the VCID management unit 40 and the VCID management tables 41 and 42 of the node configuration shown in FIG. 2 described above can be conveniently implemented in form of software package. Note that the ATM signaling unit 30 of the node configuration shown in FIG. 2 can be found in a form of existing software for ATM signaling so that it can be omitted from such a software package, but it is obviously also possible to implement the node configuration of FIG. 2 including the ATM signaling unit 30 in form of software package. It is also possible to implement the VCID management tables 41 and 42 by hardware components and provide the above software package with a function to carry out read/write with respect to these VCID management tables.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A node device, comprising:

an interface for a virtual connection-oriented network;

a first message exchange unit configured to exchange a first message which contains a first identifier for provisionally identifying a virtual connection between said node device and a neighboring node device, at a time of setting up the virtual connection through the interface, the first identifier being a common identifier to be used in provisionally identifying the virtual connection at both of said node device and the neighboring node device;

a management unit configured to manage a correspondence between the first identifier and a second identifier having a larger information size than the first identifier for formally identifying the virtual connection between said node device and the neighboring node device, the second identifier being another common identifier to be used in formally identifying the virtual connection at both of said node device and the neighboring node device; and a second message exchange unit configured to transmit or receive a second message which contains the second identifier in a form that enables establishing of a correspondence between the first identifier and the second identifier, through another virtual connection different from the virtual connection to be set up;

wherein the management unit manages the virtual connection by the second identifier and makes the first identifier available for other virtual connections, after the virtual connection is set up by the exchange of the first message by the first message exchange unit and the second identifier is shared between said node device and the neighboring node device by exchange of the second message by the second message exchange unit.

2. The node device of claim 1, wherein the first message exchange unit exchanges the first message in a form of a datalink layer signaling message, and the second message exchange unit exchanges the second message in a form of a network layer message.

3. The node device of claim 1, wherein the second message exchange unit also transmits or receives a flow identification information for identifying a flow of packets to be transmitted through the virtual connection.

4. The node device of claim 3, wherein the second message exchange unit exchanges the second message which also contains the flow identification information in a form that enables establishing of a correspondence between the flow identification information and the first identifier or the second identifier.

5. The node device of claim 3, wherein the second message exchange unit also transmits or receives a third message which contains the flow identification information in a form that enables establishing of a correspondence between the flow identification information and the first identifier or the second identifier.

6. The node device of claim 3, wherein the interface transmits packets belonging to the flow through the virtual connection, after the second identifier and the flow identification information are shared between said node device and the neighboring node device by exchange of the second message by the second message exchange unit.

7. The node device of claim 3, wherein the management unit releases the virtual connection through the interface and makes the second identifier available for another virtual connection when transmission of packets belonging to the flow is judged to be unnecessary.

8. The node device of claim 3, wherein the management unit transmits or receives a message for removing a correspondence between the flow identification information and the second identifier through the second message exchange unit while maintaining the virtual connection when transmission of packets belonging to the flow is judged to be unnecessary, and makes the virtual connection available for transmission of packets belonging to another flow.

9. The node device of claim 3, wherein the interface interprets packets received through the virtual connection as packets belonging to the flow.

10. The node device of claim 1, wherein the management unit maintains the first identifier for the virtual connection even after the virtual connection is set up by exchange of the first message by the first message exchange unit and the second identifier is shared between said node device and the neighboring node device by exchange of the second message by the second message exchange unit, when there is a possibility for subsequently adding a new leaf to the virtual connection.

11. A method for sharing a common virtual connection identifier between neighboring nodes, comprising the steps of:

exchanging a first message between the neighboring nodes, the first message containing a first identifier for provisionally identifying a virtual connection between the neighboring nodes, at a time of setting up the virtual connection, the first identifier being a common identifier to be used in provisionally identifying the virtual connection at both of said node device and the neighboring node device;

exchanging a second message between the neighboring nodes, the second message containing a second identifier having a larger information size than the first identifier for formally identifying the virtual connection between the neighboring nodes, in a form that enables establishing of a correspondence between the first identifier and the second identifier, through another virtual connection different from the virtual connection to be set up, the second identifier being another common identifier to be used in formally identifying the virtual connection at both of said node device and the neighboring node device; and managing a correspondence between the first identifier and the second identifier at each of the neighboring nodes according to the first message and the second message so as to share the second identifier between the neighboring nodes, and managing the virtual connection by the second identifier and making the first identifier available for other virtual connections after the virtual connection is set up by the exchange of the first message and the second identifier is shared between the neighboring nodes by exchange of the second message.

12. The method of claim 11, wherein the first message and the second message are transmitted from an upstream node to a downstream node among the neighboring nodes.

13. The method of claim 11, wherein the first message is transmitted from an upstream node to a downstream node among the neighboring nodes, and the second message is transmitted from the downstream node to the upstream node.

14. The method of claim 11, wherein the first message is transmitted from a downstream node to an upstream node among the neighboring nodes, and the second message is transmitted from the upstream node to the downstream node.

15. The method of claim 11, wherein the first message and the second message are transmitted from a downstream node to an upstream node among the neighboring nodes.

16. The method of claim 11, wherein the first message is exchanged before the second message is exchanged.

17. The method of claim 11, wherein the first message is exchanged to set up the virtual connection after the second message is exchanged.

18. The method of claim 11, wherein the first message is exchanged in a form of a datalink layer signaling message, and the second message is exchanged in a form of a network layer message.

19. The method of claim 11, further comprising the step of:

exchanging a flow identification information for identifying a flow of packets to be transmitted through the virtual connection between the neighboring nodes.

20. The method of claim 19, wherein the flow identification information is exchanged by the second message which also contains the flow identification information in a form that enables establishing of a correspondence between the flow identification information and the first identifier or the second identifier.

21. The method of claim 19, wherein the flow identification information is exchanged by a third message which contains the flow identification information in a form that enables establishing of a correspondence between the flow identification information and the first identifier or the second identifier.

22. The method of claim 19, further comprising the step of:

transmitting packets belonging to the flow through the virtual connection, after the second identifier and the flow identification information are shared between the neighboring nodes by exchange of the second message.

23. The method of claim 19, wherein the managing step also releases the virtual connection and makes the second identifier available for other virtual connections when transmission of packets belonging to the flow is judged to be unnecessary.

24. The method of claim 19, wherein the managing step also transmits or receives a message for removing a correspondence between the flow identification information and the second identifier while maintaining the virtual connection when transmission of packets belonging to the flow is judged to be unnecessary, and makes the virtual connection available for transmission of packets belonging to another flow.

25. The method of claim 19, further comprising the step of:

interpreting packets received through the virtual connection as packets belonging to the flow at each node.

26. The method of claim 11, wherein the managing step also maintains the first identifier for the virtual connection even after the virtual connection is set up by exchange of the first message and the second identifier is shared between the neighboring nodes by exchange of the second message, when there is a possibility for subsequently adding a new leaf to the virtual connection.

27. A computer usable medium having computer readable program codes embodied therein for causing a computer at a node device to function as a system that enables sharing of a common virtual connection identifier between neighboring nodes, the computer readable program codes include:

a first computer readable program code for causing said computer to exchange a first message which contains a first identifier for provisionally identifying a virtual connection between said node device and a neighboring node device, at a time of setting up the virtual connection, the first identifier being a common identifier to be used in provisionally identifying the virtual connection at both of said node device and the neighboring node device;

a second computer readable program code for causing said computer to manage a correspondence between the first identifier and a second identifier having a larger information size than the first identifier for formally identifying the virtual connection between said node device and the neighboring node device, the second identifier being another common identifier to be used in formally identifying the virtual connection at both of said node device and the neighboring node device; and a third computer readable program code for causing said computer to transmit or receive a second message which contains the second identifier in a form that enables establishing of a correspondence between the first identifier and the second identifier, through another virtual connection different from the virtual connection to be set up;

wherein the second computer readable program code manages the virtual connection by the second identifier and makes the first identifier available for other virtual connections, after the virtual connection is set up by the exchange of the first message by the first computer readable program code and the second identifier is shared between said node device and the neighboring node device by exchange of the second message by the third computer readable program code.

28. The article of manufacture of claim 27, wherein the first computer readable program code causes said computer to exchange the first message by utilizing an existing computer program for signaling message exchange.

* * * * *